March 22, 1955  S. H. HAHN  2,704,700
HELIX RECORDER
Filed Jan. 29, 1952  2 Sheets-Sheet 1

INVENTOR.
STUART H. HAHN
BY
Mellin and Hanscom
ATTORNEYS

March 22, 1955

S. H. HAHN 2,704,700

HELIX RECORDER

Filed Jan. 29, 1952

INVENTOR.
STUART H. HAHN
BY
Mellin and Hanscom
ATTORNEYS

United States Patent Office 2,704,700
Patented Mar. 22, 1955

2,704,700

HELIX RECORDER

Stuart H. Hahn, Los Gatos, Calif., assignor to Dalmo Victor Company, San Carlos, Calif., a corporation of California Application January 29, 1952, Serial No. 268,839

5 Claims. (Cl. 346—101)

This invention relates to a helix recorder.

A main object of the present invention is to provide an improved helix recorder.

Helix recorders, in general, have in the past included a sheet of electro-sensitive paper fed at a relatively slow speed between a pair of conductors, one conductor comprising a relatively high speed rotary helix drum in electrical contact with one side of the chart paper, and the other conductor comprising a pick-up element extending completely across the opposite side of the chart paper in electrical contact with the paper for the full transverse dimension thereof. In a usual arrangement, a single marking voltage pulse, generated in a manner not necessary here to describe, is fed to the helix drum for each complete sweep of a helix blade across the paper, said pulse being supplied in timed relation to the speeds of the paper and helix drum, so that a graph or the like can be marked on the paper by virtue of the fact that the electro-sensitive paper is sensitive to the passage of current therethrough and is discolored or marked by such passage. The chart paper is relatively tender and weak, for various reasons including its inherent construction and the fact that it is hygroscopic and therefore readily absorbs water which weakens the paper. Also, because the paper is somewhat gummy, there is a high coefficient of friction between the blades on the helix drum and the paper. Difficulty has been encountered in prior helix recorders because of the tearing of the chart paper due to the wiping action of the rapidly rotating helix drum against the relatively slow moving chart paper. This difficulty is accentuated when it is attempted to increase the overall speed of the helix recorder for the purpose of recording a higher pulse frequency.

It is a primary object of the present invention to provide a helix recorder which may operate at a higher speed than prior recorders without danger of tearing the paper.

More particularly, it is an object of the present invention to provide a slow speed transfer roll in engagement with the paper and preferably driving the paper, which transfer roll is in turn engaged by a high speed helix drum, to thereby provide a high speed helix recorder without danger of damaging the chart paper.

A further object of the present invention is to provide a helix recorder having an arrangement whereby a relatively long strip or length of the recorded paper may be examined in a supported condition so as to avoid the possibility of tearing of the paper during examination of long lengths thereof, and which arrangement is compacted so as not to unnecessarily increase the length of the recorder over the length of prior helix recorders.

Various other objects will be apparent from the following description taken in connection with the accompanying drawings wherein.

Figure 1:
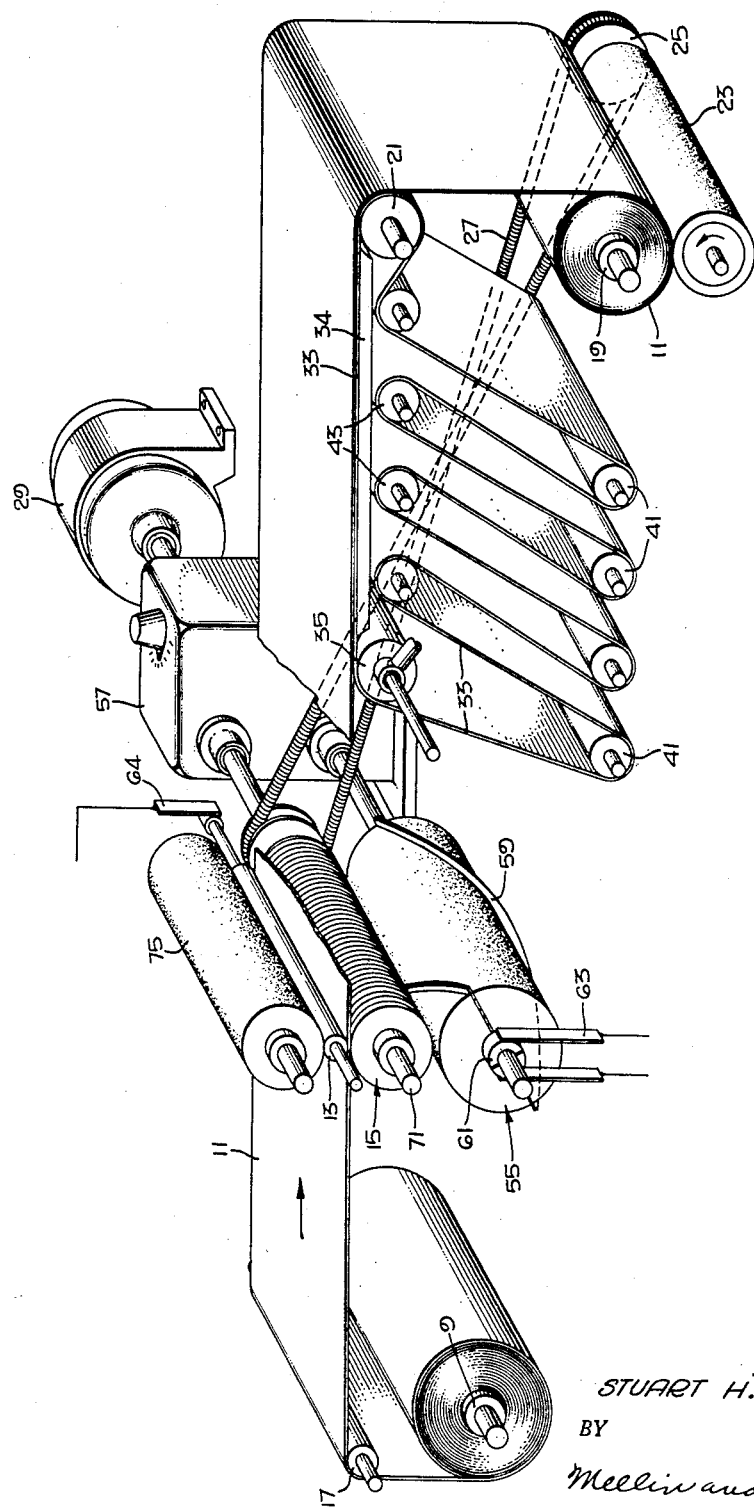
Fig. 1 illustrates a helix recorder embodying the concepts of the present invention and showing the frame of the machine as having been removed.
Figure 2:
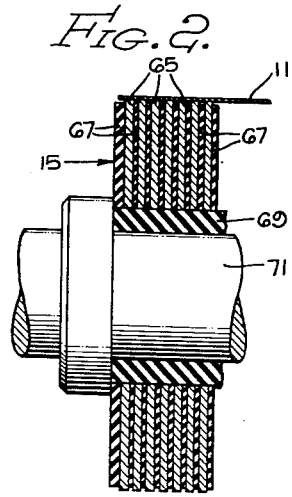
Fig. 2 is a fragmentary longitudinal mid-sectional view through the transfer roll and showing the construction thereof.

Referring to the accompanying drawings wherein similar reference characters designate similar parts throughout, the helix recorder, best shown in Fig. 1, includes a supply roll 9 having a stock of electro-sensitive chart paper 11 and adapted to supply the chart paper to between a contact roll 13 and a transfer roll 15. There is a suitable friction drag mechanism (not shown) engaging supply roll 9 to prevent supply roll 9 from overrunning. The chart paper is adapted to be guided between the contact roll 13 and transfer roll 15 by a guide roll 17. Chart paper 11 is adapted to be wound up on a take-up roll 19 and is guided toward the take-up roll by a guide roll 21 disposed above the take-up roll 19. Take-up roll 19 is adapted to be driven through a drive roll 23 driven through an adjustable, essentially constant, tension device 25 by a belt 27, said belt being driven at a speed considerably in excess of the normal paper velocity indirectly by a motor 29 in a manner to be described hereinafter. Device 25 is of conventional design and urges the paper onto take-up roll 19 at approximately constant tension regardless of the wound diameter of the roll or its relative direction of rotation.

The length of chart paper between the transfer roll 15 and the guide roll 21 is supported in planar condition by a continuous belt 33 which is supported by a table 34 and extends around guide roll 21 and a bodily movable idler roll 35. Roll 35 is supported by an extensible telescopic assembly 37 from a frame 39 of the helix recorder, see Fig. 4. Belt 33 has a plurality of take-up loops therein which pass about a plurality of bodily movable take-up rolls 41 and a plurality of bodily stationary take-up rolls 43. The various rolls mentioned hereinbefore and to be mentioned hereinafter are all suitably journaled in frame 39 for rotary movement and are bodily stationary with the exception of idler roll 35, lower belt take-up rolls 41 and drive roll 23. Take-up rolls 41 are supported at their ends in inclined elongated slots 45 (see Fig. 5) and urged to remain in their downward position by means of tension springs 47 which are secured to the rolls in any suitable manner such as by collars 49.

Figure 4:
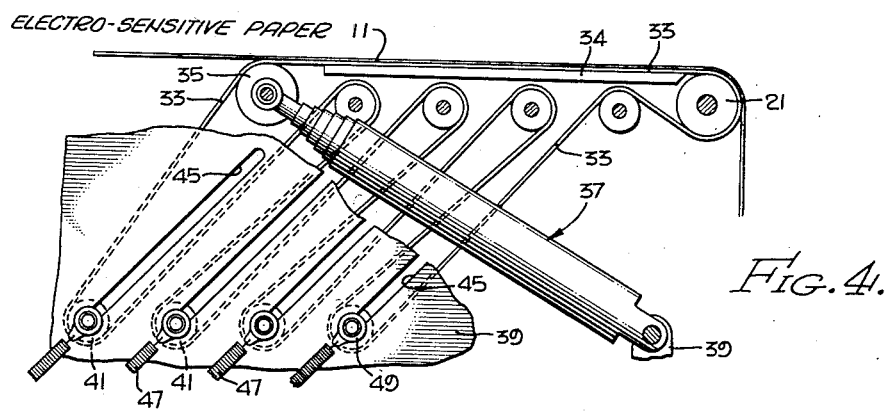
Fig. 4 is a fragmentary view in side elevation showing the arrangement for extending the chart paper supporting belt and the chart paper.
Figure 5:
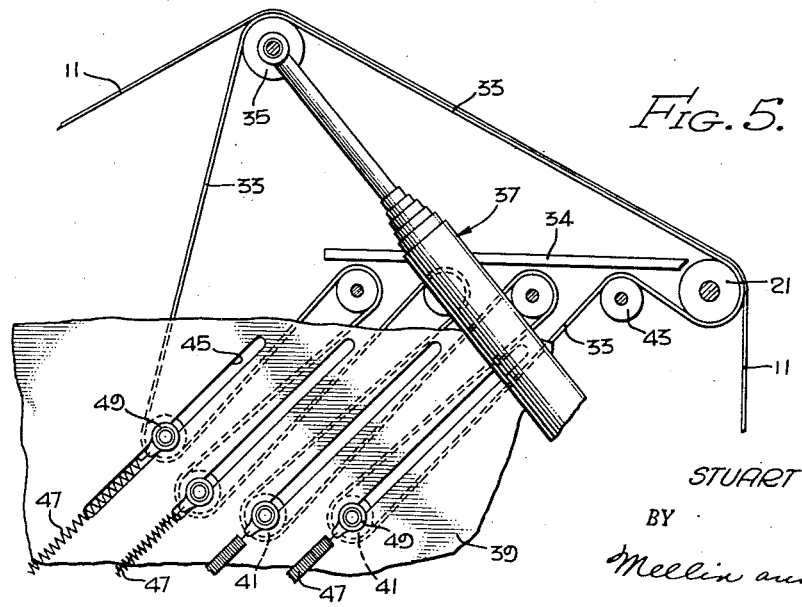
Fig. 5 is a view similar to Fig. 4 and showing the belt and paper in extended condition.

Normally, the length of chart paper between the transfer roll 15 and the guide roll 21 will be supported in a planar condition by the table 34 but when it is desired to inspect or examine a considerable length of the recorded chart paper, the extensible assembly 37 may be extended from the position shown in Fig. 4 to the position shown in Fig. 5 thereby extending the belt 33 to thereby unwind a portion of the chart paper 11 from the take-up roll 19. During this time, the lower take-up rolls 41 are progressively drawn upwardly in their respective slots. Device 25 permits withdrawing of the paper 11 from the take-up roll 19, and then, as assembly 37 is contracted, functions to wind up the withdrawn paper as well as the accumulated paper passing between rolls 13 and 15 during the examination period.

Whereas in prior helix recorders there was a high speed helix drum in direct contact with a low speed web of chart paper, in the present invention the transfer roll 15 is disposed between the chart paper 11 and a helix drum 55. The transfer roll 15 is not only driven at a slow speed, but is also arranged so as to frictionally drive the chart paper 11 and eliminate the sprocket and perforation-type drive common in prior devices.

Figure 3:
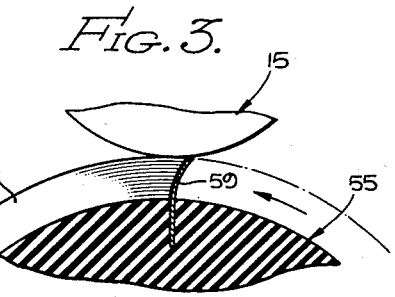
Fig. 3 is a fragmentary sectional view through the transfer roll and helix drum showing a helix blade in engagement with the transfer roll.

Transfer roll 15 is adapted to be driven by motor 29 through a change gear and reduction unit box 57, said box 57 providing, by a suitable interchange of gears, for a higher or lower speed drive of the paper 11. Helix drum 55 is also adapted to be driven from the box 57 but at a much higher rate of speed than the transfer roll 15. It is obvious that the transfer roll will not be adversely affected by the frictional engagement of the helix drum 55 therewith as would be the chart paper 11. Helix drum 55 has either one or a plurality of helix blades 59 on the periphery thereof, said helix blades preferably being of strip-like formation as shown in Fig. 3 and flexible so as to ensure a good contact with the transfer roll.

Electrical pulses can be supplied to the helix drum 55 and the blades 59 by means of a split ring arrangement at 61 and suitable brushes 63. Contact roll 13 also has a brush 64 to complete the circuit through the recorder.

For the purpose of transferring the electrical voltage pulses from the helix drum 55 to the contact roll 13 through the paper 11, the transfer roll 13 comprises alternating laminae of conducting annular elements 65 and insulating annular elements 67. Preferably, these annular elemets are mounted on a resilient sleeve 69 fitting on a central shaft 71 of the transfer roll so that the transfer roll has a good conformity with the paper 11, so as to press against the paper to enable a drive of the paper. Preferably, the diameters of the insulating elements 67 are slightly less than the diameters of the conducting elements 65 so as to protect the insulating elements 67 from the rubbing action of the blades 59. It is apparent that an electrical voltage pulse will travel from one of the blades 59 to the particular annular conducting element 65 which happens to be in contact with the blade at the time the pulse is applied to the blade, the pulse traveling through said particular conducting element to the chart paper 11, through he chart paper and to the contact roll 13 thereby marking the electro-sensitive chart paper.

Preferably, the contact roll 13 is supported in frame 39 of the helix recorder so as to be allowed some floating movement. In such case, a resilient back-up roll 75 is provided in engagement with the contact roll 13 and presses it lightly into engagement with the chart 11. The resilient back-up roll 75 may idle or may be driven through the box 57 if desired.

The operation of the helix recorder has been described during the description of the parts and therefore need not be repeated. The present invention provides a helix recorder which can be operated at a high speed without danger of damaging the chart paper since the chart paper does not engage a high speed rotary drum but engages and is driven by a low speed transfer roll. By the present invention, a considerable length of the recorded paper can be withdrawn and extended by the extensible arrangement disclosed to permit an examination of this recorded paper without danger of damaging the paper.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a helix recorder, having a pair of spaced conductors including a rotary helix drum and means for feeding a web of chart paper between the conductors at a velocity substantially less than the velocity of the helix drum, the improvement which comprises a laminated transfer roll between the helix drum and the paper for transferring the voltage pulses from the drum to the other conductor through the paper, and means for rotating said transfer roll at a peripheral velocity equal to the velocity of the chart paper.

2. In a helix recorder, having a pair of spaced conductors including a rotary helix drum and means for feeding a web of chart paper between the conductors at a velocity substantially less than the velocity of the helix drum, the improvements which comprises a laminated transfer roll between the helix drum and the paper for transferring the voltage pulses from the drum to the other conductor through the paper, means for rotating said transfer roll at a peripheral velocity equal to the velocity of the chart paper, said transfer roll comprising alternating laminae of conducting and insulating elements.

3. In a helix recorder, a pair of spaced conductors one of which is in the form of a rotary helix drum, means for supporting and supplying a web of electro-sensitive chart paper to between the conductors, a laminated transfer roll between the helix drum and the paper in contact with both and pressing the web of paper against the other conductor, said other conductor being in the form of a roll, and means for driving the transfer roll to thereby drive the paper.

4. In a helix recorder, a pair of spaced conductors one of which is in the form of a rotary helix drum, means for supporting and supplying a web of electro-sensitive chart paper to between the conductors, a laminated transfer roll between the helix drum and the paper in contact with both and pressing the web of paper against the other conductor, said other conductor being in the form of a roll resiliently pressed toward the transfer roll, and means for driving the transfer roll and therefore the paper at a velocity substantially less than the velocity of the helix drum.

5. In a helix recorder, a pair of spaced conductors one of which is in the form of a rotary helix drum, means for supporting and supplying a web of electro-sensitive chart paper to between the conductors, a laminated transfer roll between the helix drum and the paper in contact with both and pressing the web of paper against the other conductor, said other conductor being in the form of a roll resiliently pressed toward the transfer roll, and means for driving the transfer roll and therefore the paper at a velocity substantially less than the velocity of the helix drum, said transfer roll comprising alternating laminae of conducting and insulating elements.

References Cited in the file of this patent

UNITED STATES PATENTS

| Number | Name | Date |
|---|---|---|
| 1,814,424 | Barr | July 14, 1931 |
| 2,268,031 | Guthrie | Dec. 30, 1941 |
| 2,376,370 | Lombardi | May 22, 1945 |
| 2,432,303 | Fox | Dec. 9, 1947 |
| 2,550,618 | Strohm | Apr. 24, 1951 |
| 2,560,247 | Rich | July 10, 1951 |
| 2,580,464 | Rohrberg | Jan. 1, 1952 |
| 2,590,554 | Lukacs | Mar. 25, 1952 |
| 2,592,567 | Hester | Apr. 15, 1952 |